United States Patent
Han et al.

(10) Patent No.: US 8,437,636 B2
(45) Date of Patent: May 7, 2013

(54) METHODS OF TRANSMITTING AND RECEIVING MULTICAST OR BROADCAST FRAME IN OLT AND ONU FOR WDM-PON, WDM-PON SYSTEM, AND OLT FOR WDM-PON

(75) Inventors: Kyeong-eun Han, Jeonju-si (KR); Kwang-joon Kim, Daejeon-si (KR)

(73) Assignee: Electronics and Telecommunications Research Institute (KR)

( * ) Notice: Subject to any disclaimer, the term of this patent is extended or adjusted under 35 U.S.C. 154(b) by 571 days.

(21) Appl. No.: 12/580,177

(22) Filed: Oct. 15, 2009

(65) Prior Publication Data
US 2010/0158523 A1   Jun. 24, 2010

(30) Foreign Application Priority Data

Dec. 22, 2008 (KR) .................... 10-2008-00131701

(51) Int. Cl.
*H04J 14/00* (2006.01)
(52) U.S. Cl.
USPC .............................................. 398/68; 398/75
(58) Field of Classification Search .............. 398/66–68, 398/70–72, 74, 75, 46
See application file for complete search history.

(56) References Cited

U.S. PATENT DOCUMENTS

| 7,483,633 B2 * | 1/2009 | Ishimura ........................ 398/75 |
| 2003/0235205 A1 * | 12/2003 | Song et al. .................... 370/466 |
| 2005/0013314 A1 | 1/2005 | Lim et al. |
| 2008/0205403 A1 * | 8/2008 | Akyol et al. ................. 370/392 |
| 2008/0304830 A1 * | 12/2008 | Huang et al. .................... 398/79 |
| 2010/0196010 A1 * | 8/2010 | Miura ............................ 398/72 |

FOREIGN PATENT DOCUMENTS

| KR | 10-2005-0008443 A | 1/2005 |
| KR | 10-0570842 | 4/2006 |

OTHER PUBLICATIONS

Han, Kyeong-Eun, et al., "Design of AWG-based WDM-PON Architecture with Multicast Capability," Chonbuk National University; Apr. 13, 2008, 6 pages.

* cited by examiner

*Primary Examiner* — Dalzid Singh
(74) *Attorney, Agent, or Firm* — Blakely, Sokoloff, Taylor & Zafman

(57) ABSTRACT

Provided are methods of transmitting and receiving a multicast or broadcast frame in an optical line terminal (OLT) and an optical network unit (ONU) for a wavelength division multiplexing (WDM)-passive optical network (PON), a WDM-PON system, and an OLT for a WDM-PON. The method of transmitting a multicast or broadcast frame in an OLT for a WDM-PON includes converting and splitting a multicast or broadcast frame input using a single wavelength into a plurality of wavelengths, combining the split wavelengths, and outputting the multicast or broadcast frame. In this way, a multicast or broadcast frame can be transmitted and received, thereby providing a single copy broadcast (SCB) function in a WDM-PON.

11 Claims, 5 Drawing Sheets

FIG.5
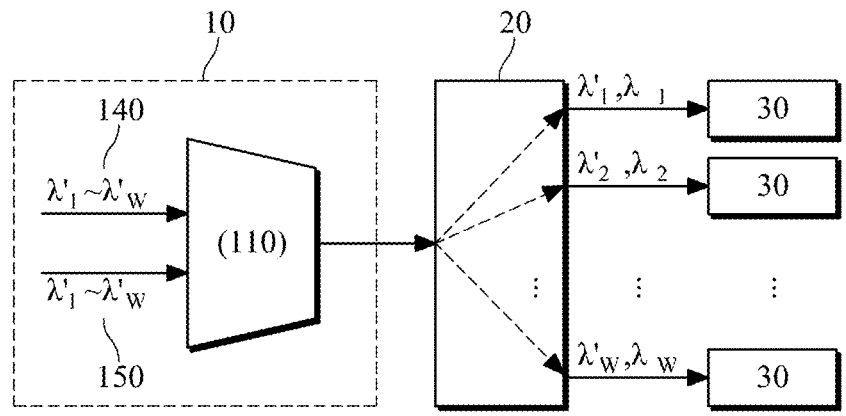
FIG.6
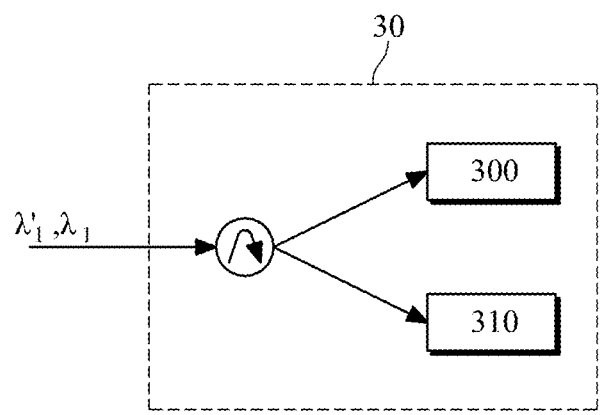
FIG.7
| Preamble (8byte) | DA (6byte) | SA (6byte) | Type (2byte) | M (1bit) | MG_ID (15bit) | Data (Variable size) | FCS (4byte) | ns
METHODS OF TRANSMITTING AND RECEIVING MULTICAST OR BROADCAST FRAME IN OLT AND ONU FOR WDM-PON, WDM-PON SYSTEM, AND OLT FOR WDM-PON

CROSS-REFERENCE TO RELATED APPLICATION

This application claims the benefit under 35 U.S.C. §119(a) of Korean Patent Application No. 10-2008-0131701, filed on Dec. 22, 2008, the disclosure of which is incorporated herein in its entirety by reference.

BACKGROUND

1. Field

The following description relates to data transmission technology, and more particularly, to methods of transmitting and receiving a multicast or broadcast frame in an optical line terminal (OLT) and an optical network unit (ONU) for a wavelength division multiplexing (WDM)-passive optical network (PON), a WDM-PON system, and an OLT for a WDM-PON.

2. Description of the Related Art

As next-generation optical network technology using a WDM technique, WDM-PONs overcome poor scalability and security of conventional Ethernet PONs (EPONs) and provide high-capacity and high-quality service.

Such a WDM-PON has a tree architecture in which ONUs and an OLT are connected through a remote node (RN). Also, data transmission between the OLT and the ONUs is performed using wavelengths respectively assigned to the ONUs. Thus, WDM-PONs are attracting attention as next-generation PONs that can solve the problems of optical signal attenuation and poor security caused by a conventional passive splitter and provide each ONU with high-quality broadband service using a single transmission wavelength.

SUMMARY

The following description relates to a multicast or broadcast frame transmitting method and apparatus providing a single copy broadcast (SBC) function in a wavelength division multiplexing (WDM)-passive optical network (PON).

According to an exemplary aspect, there is provided a method of transmitting a multicast or broadcast frame in an optical line terminal (OLT) for a wavelength division multiplexing (WDM)-passive optical network (PON). The method includes converting and splitting a single wavelength into a plurality of wavelengths, and outputting the multicast or broadcast frame using the split wavelengths, and combining the split wavelengths, and transmitting the output multicast or broadcast frame to a remote node (RN) using the combined wavelength.

According to another exemplary aspect, there is provided a method of receiving a multicast or broadcast frame in an optical network unit (ONU) for a wavelength division multiplexing (WDM)-passive optical network (PON). The method includes receiving a data frame using a wavelength routed according to an input port of a remote node (RN) and a wavelength type based on a mode bit indicating a type of the data frame and a multicast group identifier (ID) indicating a multicast service group.

According to still another exemplary aspect, there is provided a wavelength division multiplexing (WDM)-passive optical network (PON) system, including: an optical line terminal (OLT) converting and splitting a multicast or broadcast frame input using a single wavelength into a plurality of wavelengths, combining the split wavelengths, and outputting the multicast or broadcast frame; a remote node (RN) receiving the output multicast or broadcast frame and selectively routing a wavelength according to an input port and a wavelength type; and an optical network unit (ONU) receiving the multicast or broadcast frame using the wavelength selectively routed by the RN based on a mode bit and a multicast group identifier (ID).

According to yet another exemplary aspect, there is provided an optical line terminal (OLT) for a wavelength division multiplexing (WDM)-passive optical network (PON), including: a multi-wavelength converter (MWC) converting and splitting a single wavelength into a plurality of wavelengths, and outputting a multicast or broadcast frame using the split wavelengths; and a multiplexer (MUX) combining the split wavelengths, and transmitting the output multicast or broadcast frame to a remote node (RN) using the combined wavelength.

Other objects, features and advantages will be apparent from the following description, the drawings, and the claims.

BRIEF DESCRIPTION OF THE DRAWINGS

FIG. 5 illustrates a wavelength-selection routing process of a remote node (RN) according to an exemplary embodiment.

FIG. 6 illustrates a multicast or broadcast frame receiving structure of an optical network unit (ONU) according to an exemplary embodiment.

FIG. 7 illustrates a constitution of a data frame for multicast or broadcast frame transmission according to an exemplary embodiment.

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
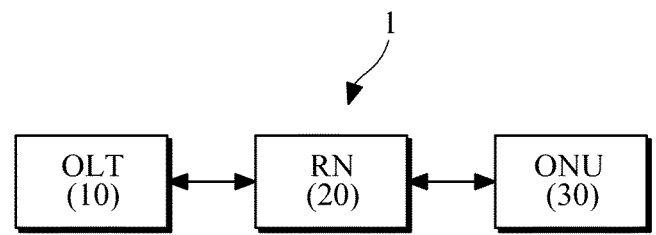
FIG. 1 is a block diagram of a wavelength division multiplexing (WDM)-passive optical network (PON) system according to an exemplary embodiment.

FIG. 1 is a block diagram of a wavelength division multiplexing (WDM)-passive optical network (PON) system 1 according to an exemplary embodiment. Referring to FIG. 1, the is PON system 1 according to an exemplary embodiment includes an optical line terminal (OLT) 10, a remote node (RN) 20, and an optical network unit (ONU) 30.

In telecommunication using optical fibers, a WDM technique employed in exemplary embodiments simultaneously transmits a plurality of channels using light of different wavelengths. In a WDM-PON according to an exemplary embodiment, the single OLT 10 and a plurality of the ONUs 30 are connected through the RN 20 in a tree form.

In particular, the RN 20 according to an exemplary embodiment may be configured in the form of an arrayed-waveguide grating (AWG). An AWG is a passive device having a wavelength-selection routing function, and an output port is determined according to a wavelength and an input port. The RN 20 may consist of a single AWG or a plurality of AWGs. Also, the WDM-PON can be connected to a plurality of input ports of an N×N AWG to reuse limited wavelengths. Here, the OLT 10 may transmit data to n of the ONUs 30 using W wavelengths.

In the WDM-PON according to an exemplary embodiment, the OLT 10 converts and splits a multicast or broadcast frame input using a single wavelength into a plurality of wavelengths, combines the split wavelengths, and outputs the multicast or broadcast frame. Then, the RN 20 receives the output multicast or broadcast frame, and selectively routes a wavelength according to an input port and a wavelength type. And, the ONUs 30 receive the multicast or broadcast frame using the wavelength selectively routed by the RN 20 based on a mode bit and a multicast group identifier (ID). A process of transmitting a multicast or broadcast frame using a mode bit and a multicast group ID will be described in detail below with reference to drawings.

Figure 2:
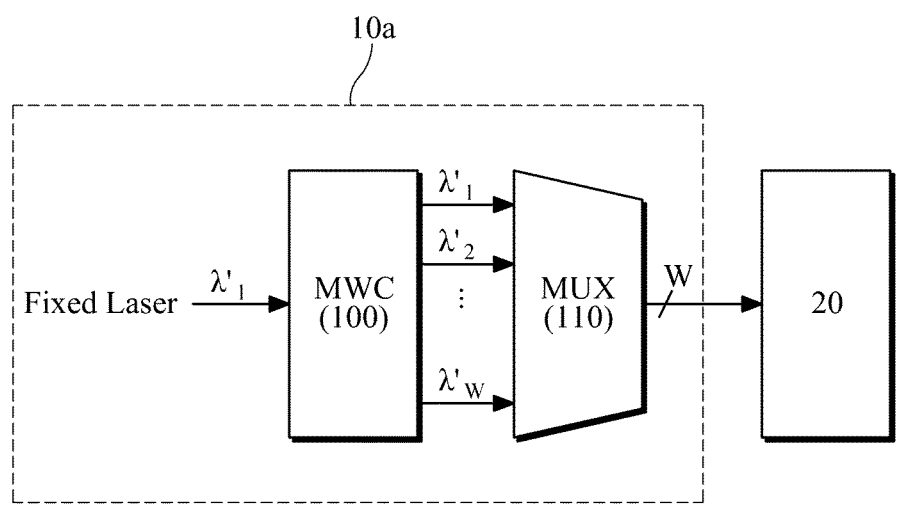
FIG. 2 is a block diagram of an optical line terminal (OLT) according to an exemplary embodiment.

FIG. 2 is a block diagram of an OLT 10a according to an exemplary embodiment. Referring to FIG. 2, the OLT 10a according to an exemplary embodiment includes a multi-wavelength converter (MWC) 100 and a multiplexer (MUX) 110.

The MWC 100 converts and splits a single wavelength generated by a fixed laser for multicast or broadcast frame transmission into a plurality of wavelengths, and outputs a multicast or broadcast frame using the split wavelengths. The MWC 100 is a device having the function of converting and splitting a single wavelength into a plurality of wavelengths. The MUX 110 combines the wavelengths converted and split by the MWC 100, and transmits the output multicast or broadcast frame to the RN 20 using the combined wavelength.

For example, as illustrated in FIG. 2, a multicast or broadcast frame input using a single wavelength is converted into W wavelengths by the MWC 100 and combined by the W×1 MUX 110. The multicast or broadcast wavelength combined by the W×1 MUX 110 is input to an input port of the AWG-based RN 20, and output through an AWG output port as a point-to-point (P2P) transmission wavelength due to a free spectral range (FSR) characteristic of the AWG-based RN 20.

The MWC 100 and the MUX 110 facilitate implementation of single copy broadcast (SCB) and can ensure the transparency of multicast transmission. Like multicast or broadcast transmission, SCB is a function of providing the same information to several users or ONUs.

In a conventional PON, when a multicast or broadcast packet is carried by a single wavelength, it is automatically transmitted to all ONUs by a passive splitter of an RN. However, such a method has the problems of scalability depending on the splitting ratio of the passive splitter, signal attenuation, and SCB provision.

Meanwhile, when conventional WDM-PON technology is used, one packet must be copied (electrical signal distribution) as many times as the number of used wavelengths and transmitted using the respective wavelengths, and thus SCB cannot be supported. When SCB is not supported, the packet must be copied as many times as the number of wavelengths by an electrical splitter. Thus, the signal attenuates, and the signal quality may deteriorate due to noise. Also, many amplifiers are needed to solve the problem of signal attenuation in an OLT. Thus, the OLT increases in size, and additional devices are necessary to reduce noise of a signal passing through the amplifiers.

However, the OLT 10a including the MWC 100 and the MUX 110 according to an exemplary embodiment enables multicast or broadcast transmission and solves the above-mentioned problems. In other words, through the MWC 100 and the MUX 110 according to an exemplary embodiment, one packet is carried by a wavelength without copying the packet, thereby supporting a multicast or broadcast function. When a multicast or broadcast packet is carried by one fixed wavelength, the wavelength is automatically converted and split by the MWC 100, and thus the SCB function can be easily provided.

Figure 3:
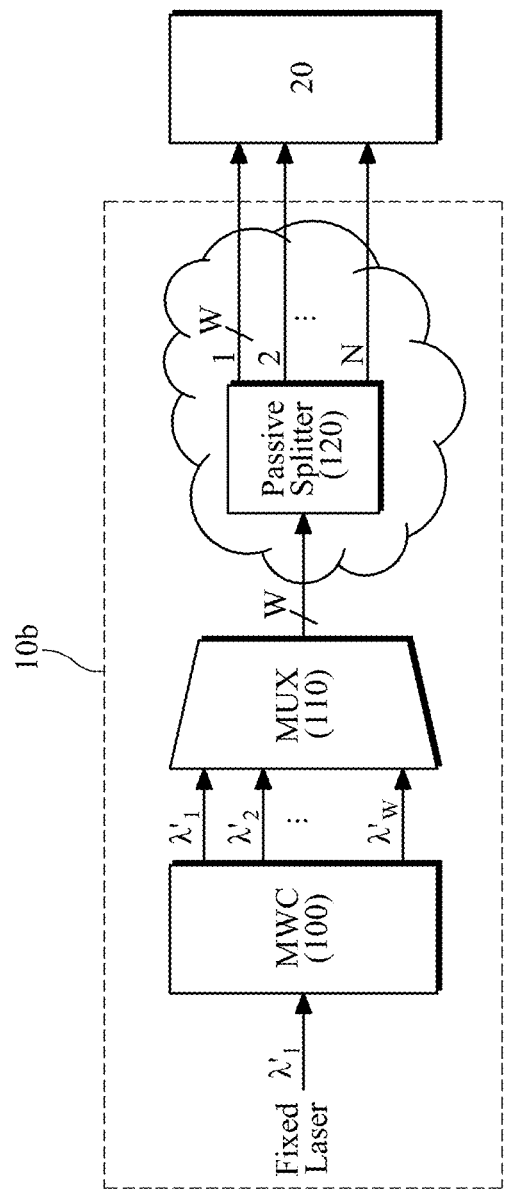
FIG. 3 is a block diagram of an OLT according to another exemplary embodiment.

FIG. 3 is a block diagram of an OLT 10b according to another exemplary embodiment. Referring to FIG. 3, the OLT 10b according to another exemplary embodiment includes a MWC 100, a MUX 110, and a passive splitter 120.

According to another exemplary embodiment, the 1×N passive splitter 120 (N≧1) may be selectively used for wavelength reuse according to wavelength input to an AWG-based RN 20 or the configuration of the RN 20 based on a plurality of AWGs. As illustrated in FIG. 3, when the OLT 10b is connected with multiple ports of the AWG-based RN 20, W wavelengths are connected to the input ports of the RN 20 through the passive splitter 120. Thus, the multicast transmission structure in which the MWC 100, the MUX 110 and the passive splitter 120 of the u) OLT 10b are combined according to another exemplary embodiment can easily implement SCB, and provide high scalability regardless of the number of AWGs and the number of ports.

Figure 4:
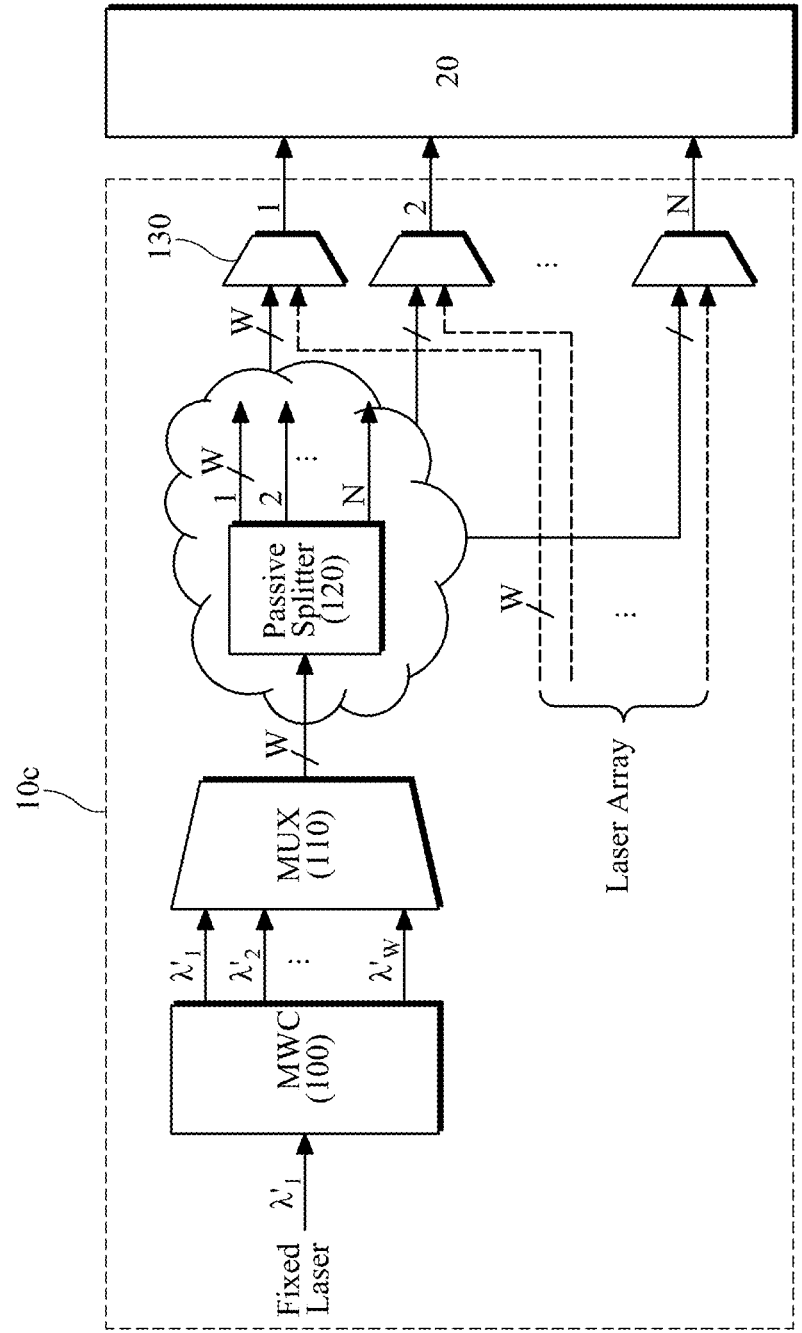
FIG. 4 is a block diagram of an OLT according to still another exemplary embodiment.

FIG. 4 is a block diagram of an OLT 10c according to still another exemplary embodiment. Referring to FIG. 4, the OLT 10c according to still another exemplary embodiment has a structure for unicast frame transmission.

P2P transmission is performed through a laser array based on a transmission wavelength and port information of the corresponding ONU. At this time, at least one laser array may be used according to a connection structure between the OLT 10c and an RN 20 and scalability. As illustrated in FIG. 4, multicast or broadcast wavelengths and unicast wavelengths are combined by a MUX 130 and input to input ports of the AWG-based RN 20. At this time, W wavelengths that are generated by a laser for multicast or broadcast transmission and pass through a MWC 100 have the same transmission path as W unicast wavelengths at the AWG-based RN 20. In other words, the multicast or broadcast wavelengths input through the same ports as the corresponding unicast wavelengths are output through the same output ports as the corresponding unicast wavelengths.

FIG. 5 illustrates a wavelength-selection routing process of an RN according to an exemplary embodiment. Referring to FIG. 5, the wavelength-selection routing process is performed as follows. First, W multicast or broadcast wavelengths 140 combined by a MUX 301 of an OLT 10 and W P2P wavelengths 150 are input to the AWG-based RN 20. Then, a wavelength-selection routing function of the AWG-based RN 20 is applied, and output ports are determined according to input ports and wavelengths. Multicast wavelengths converted by a MWC have the same AWG output ports as P2P transmission wavelengths due to a FSR characteristic of an AWG. However, wavelength-selection routing of the RN 20 illustrated in FIG. 5 is just an exemplary embodiment, and various exemplary embodiments of routing other than this are also enabled.

FIG. 6 illustrates a multicast or broadcast frame receiving structure of an ONU 30 according to an exemplary embodiment. Referring to FIG. 6, the multicast or broadcast frame receiving process of the ONU 30 is performed as follows. According to the routing characteristic of an AWG described above with reference to FIG. 5, wavelengths are transmitted is to the corresponding ONU 30 connected with an AWG output port. The ONU 30 includes two receivers 300 and 310 in order to receive a separated multicast transmission wavelength and P2P transmission wavelength. Since a multicast or broadcast frame is broadcast to ONUs, the ONU 30 receives the corresponding frame based on a destination address (DA) and a multicast group identification (ID) in an Ethernet frame.

FIG. 7 illustrates a constitution of a data frame 700 for multicast or broadcast frame transmission according to an exemplary embodiment. Referring to FIG. 7, the data frame 700 according to an exemplary embodiment includes a preamble, a DA field 710, a source address (SA) field, a type field, a mode bit field 720, a multicast group ID field 730, a data field, and a frame check sequence (FCS) field.

The DA field (6 bytes) 710 indicates a DA, and the SA field (6 bytes) indicates a SA. The type field (2 bytes) indicates a data frame type, the data field (variable size) contains real data, and the FCS field (4 bytes) contains information for detecting an error.

Meanwhile, the mode bit field (1 bit) 720 and the multicast group ID field (15 bits) 730 are obtained by modifying a part of the data frame 700. A mode bit M is used to distinguish between a broadcast frame (M=0) and a multicast frame (M=1), and a multicast group ID (MG_ID) is used to identify a multicast service group corresponding to the data frame 700. An ONU processes a P2P, broadcast or multicast frame based on the DA field 710, the mode bit field 720, and the multicast service group field 730 of the above-described constitution.

Figure 8:
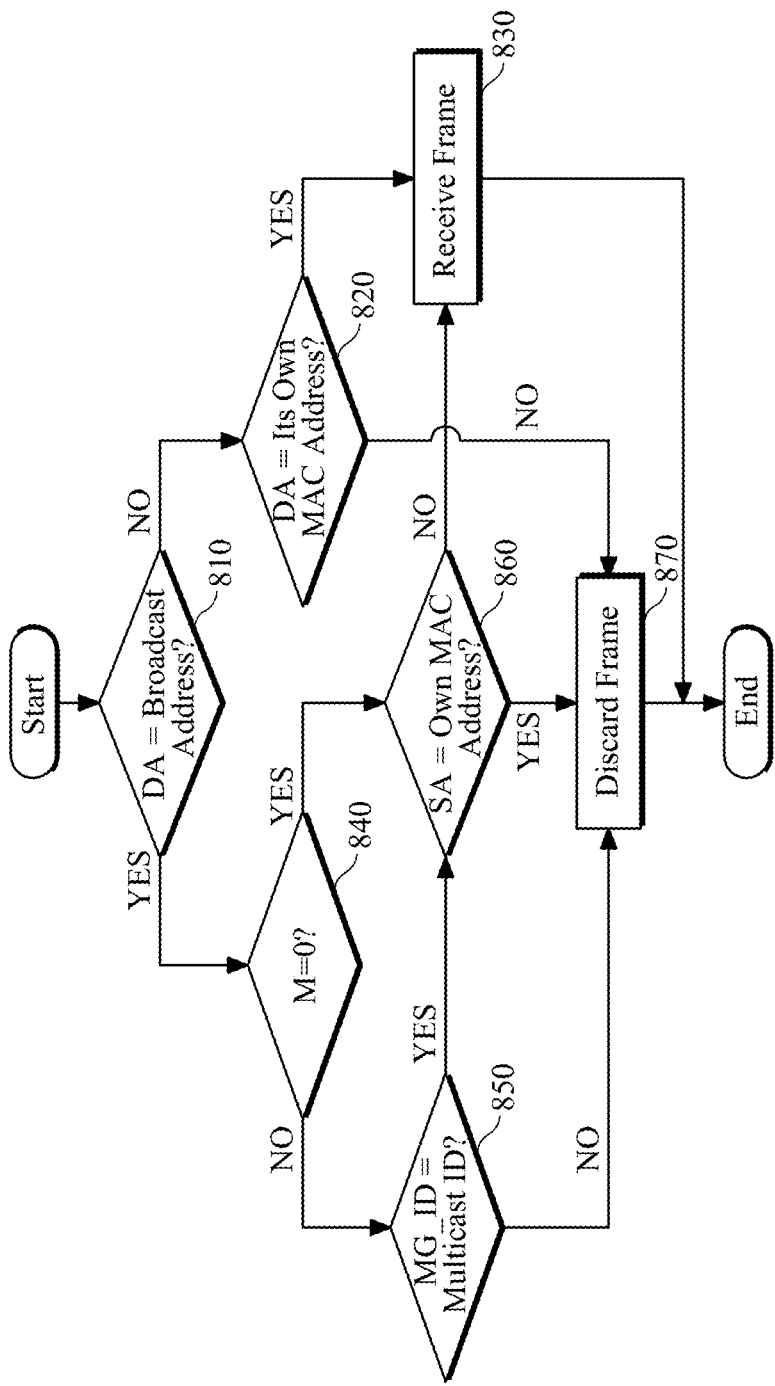
FIG. 8 is a flowchart illustrating a method of receiving a multicast or broadcast frame in an ONU according to an exemplary embodiment.

FIG. 8 is a flowchart illustrating a method of receiving a multicast or broadcast frame in an ONU according to an exemplary embodiment. Referring to FIG. 8, an ONU according to an exemplary embodiment receives a data frame using a wavelength routed according to an input port of an RN and a wavelength type based on a mode bit indicating a data frame type and a multicast group ID indicating a multicast service group.

A method in which the ONU processes a received frame using the DA field 710, the mode bit field 720 and the multicast group ID field 730 described with reference to FIG. 7 will be described in detail now. When a new data frame arrives, the ONU checks a DA (operation 810). When it is found that the DA is a broadcast address, the frame is a multicast or broadcast frame. In this case, the ONU checks a mode bit M (operation 840). When the mode bit M is 1, the ONU checks whether a value of a multicast group ID field is the same as its own multicast group ID (operation 850). When it is found that the value of a multicast group ID field is the same as the multicast group ID, the ONU checks a SA (operation 860). When the frame is a frame transmitted by the ONU itself, the ONU discards the frame (operation 870), and when the frame is not a frame transmitted by the ONU itself, the ONU receives the frame (operation 830).

On the other hand, when it is found in operation 840 that the mode bit M is 0, the frame is a broadcast frame. Thus, the ONU checks whether the SA is the same as its own media access control (MAC) address (operation 860), and receives the frame (operation 830) or discards the frame (operation 870). Meanwhile, when it is found in operation 810 that the DA is not a broadcast address, the ONU checks whether the DA is the same as the MAC address (operation 820). When the DA is the same as the MAC address, the ONU receives the frame, and when the DA is not the same as the MAC address, the ONU discards the frame (operation 870).

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

As apparent from the above description, a multicast or broadcast frame can be transmitted and received according to an exemplary embodiment, thereby providing the SCB function in a WDM-PON. In other words, an exemplary embodiment easily provides the SCB function, which is not easily implemented in a WDM-PON, using a MWC and a MUX. Also, an exemplary embodiment is simple and has high scalability in order to provide a multicast or broadcast service.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A method of transmitting a multicast or broadcast frame in an optical line terminal (OLT) for a wavelength division multiplexing (WDM)-passive optical network (PON), the method comprising:

converting and splitting a single wavelength into a plurality of wavelengths, and outputting the multicast or broadcast frame using the split wavelengths; and combining the split wavelengths, and transmitting the output multicast or broadcast frame to a remote node (RN) using the combined wavelength according to an input port of the RN and a wavelength type.

2. The method of claim 1, further comprising splitting the combined wavelength and transmitting the multicast or broadcast frame to the RN using the split wavelengths.

3. The method of claim 1, wherein a single copy broadcast (SCB) function is implemented by the multicast or broadcast frame.

4. The method of claim 1, wherein the RN is in the form of an arrayed-waveguide grating (AWG).

5. The method of claim 1, wherein the transmitting of the output multicast or broadcast frame to the RN includes, when there is a wavelength for transmitting a unicast frame, combining the unicast transmission wavelength and the combined wavelength, and transmitting the unicast frame to the RN using the combined wavelength.

6. A method of receiving a multicast or broadcast frame in an optical network unit (ONU) for a wavelength division multiplexing (WDM)-passive optical network (PON), the method comprising:

receiving a data frame using a wavelength routed according to an input port of a remote node (RN) and a wavelength type based on a mode bit indicating a type of the data frame and a multicast group identifier (ID) indicating a multicast service group.

7. The method of claim 6, wherein the data frame includes:
a preamble;
a destination address (DA) field indicating a DA;
a source address (SA) field indicating a SA;
a type field indicating a type of the data frame;
a mode bit field indicating a transmission type of the data frame a multicast group ID field indicating the multicast service group ID;
a data field containing data; and
a frame check sequence (FCS) field containing information for detecting an error.

8. The method of claim 7, wherein the receiving of the data frame includes:
when the new data frame arrives, checking the DA; when the DA is a broadcast address, checking the mode bit, and when the DA is not a broadcast address but a media access control (MAC) address of the ONU, receiving the data frame; when it is found that the mode bit is 1, checking whether the multicast group ID is a multicast ID, and when it is found that the mode bit is 0 and the SA is not the MAC address of the ONU, receiving the data frame; and
when it is found that the multicast group ID is a multicast ID and the SA is not the MAC address of the ONU, receiving the data frame.

9. A wavelength division multiplexing (WDM)-passive optical network (PON) system, comprising:
an optical line terminal (OLT) converting and splitting a multicast or broadcast frame input using a single wavelength into a plurality of wavelengths, combining the split wavelengths, and outputting the multicast or broadcast frame;
a remote node (RN) receiving the output multicast or broadcast frame and selectively routing a wavelength according to an input port and a wavelength type; and
an optical network unit (ONU) receiving the multicast or broadcast frame using the wavelength selectively routed by the RN based on a mode bit and a multicast group identifier (ID).

10. An optical line terminal (OLT) for a wavelength division multiplexing (WDM)-passive optical network (PON), comprising:
a multi-wavelength converter (MWC) converting and splitting a single wavelength into a plurality of wavelengths, and outputting a multicast or broadcast frame using the split wavelengths; and
a multiplexer (MUX) combining the split wavelengths, and transmitting the output multicast or broadcast frame to a remote node (RN) using the combined wavelength according to an input port of the RN and a wavelength type.

11. The OLT of claim 10, further comprising a passive splitter splitting the wavelength combined by the MUX and transmitting the multicast or broadcast frame to the RN using the split wavelengths.

* * * * *